(12) United States Patent
Jia et al.

(10) Patent No.: US 10,497,295 B1
(45) Date of Patent: Dec. 3, 2019

(54) NEAR-EYE DISPLAY ASSEMBLY WITH ADJUSTABLE RESOLUTION AND FRAME RATE

(71) Applicant: Facebook Technologies, LLC, Menlo Park, CA (US)

(72) Inventors: Zhang Jia, San Jose, CA (US); Ramesh Raskar, Palo Alto, CA (US); Ahmad Byagowi, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 30 days.

(21) Appl. No.: 15/921,499

(22) Filed: Mar. 14, 2018

(51) Int. Cl.
*G09G 3/02* (2006.01)
*G09G 3/00* (2006.01)

(52) U.S. Cl.
CPC ........... *G09G 3/02* (2013.01); *G09G 3/007* (2013.01); *G09G 2340/0435* (2013.01); *G09G 2354/00* (2013.01)

(58) Field of Classification Search
CPC .. G09G 3/02; G09G 3/007; G09G 2340/0435; G09G 2354/00
See application file for complete search history.

(56) References Cited

U.S. PATENT DOCUMENTS

| 8,269,692 B2 * | 9/2012 | Sugiyama | G02B 27/017 340/980 |
| 9,250,445 B2 * | 2/2016 | Tosaya | G02B 27/0172 |
| 2015/0172622 A1 * | 6/2015 | Yoon | G09G 3/3406 345/694 |

* cited by examiner

*Primary Examiner* — Chong Wu
(74) *Attorney, Agent, or Firm* — Fenwick & West LLP

(57) ABSTRACT

A near-eye display (NED) comprises an electronic display, an optical assembly, a scanning assembly, and a controller. The controller generates display instructions based in part on content. The display instructions describe a resolution within an adjustable range of resolutions and a frame rate within adjustable range of frame rates. The electronic display emits a plurality of light rays at the frame rate based on the display instructions. The scanning assembly shifts a direction of at least one of the plurality of light rays in accordance with the display instructions. The optical assembly controls a field of view at an eye box and directs the plurality of light rays including the at least one shifted light ray toward the eye box. The plurality of light rays form a virtual display that displays the content at the resolution and the frame rate.

20 Claims, 7 Drawing Sheets

NEAR-EYE DISPLAY ASSEMBLY WITH ADJUSTABLE RESOLUTION AND FRAME RATE

BACKGROUND

This disclosure relates generally to displays, and in particular, to near-eye display assembly with adjustable resolution and frame rate.

Conventional displays are typically a two dimensional (2D) grid of emitters. In conventional 2D displays, the resolution is effectively the size (diameter) of the source 'emitter'—which would be scaled by the focal length into angular space for a projector display or NED configuration. Additionally, the resolution is typically fixed. And in some instances a fixed resolution display can utilize a large amount of system resources (e.g., when displaying moving content) where there is no visual benefit to a user. For example, a viewer perceives less detail in fast moving content than static in content. Yet in conventional displays a frame rate is generally static and a resolution of presented content is generally fixed at a high resolution, which can result in an inefficient use of system resources.

SUMMARY

This present disclosure describes a near-eye display (NED) assembly with adjustable resolution and frame rate. The NED display assembly includes a controller, an electronic display, an optical assembly, and a scanning assembly. The controller is configured to generate the display instructions. The display instructions are based in part on content (e.g., speed of content to be presented, rate adjustment flag, etc.), and the display instructions describe a resolution within an adjustable range of resolutions and a frame rate within an adjustable range of frame rates. The electronic display is configured to emit a plurality of light rays at the frame rate based on the display instructions. The optical assembly is configured to control a field of view at an eye box by directing the plurality of light rays from the electronic display toward the eye box. The scanning assembly is configured to shift a direction of at least one of the plurality of light rays in accordance with display instructions such that a virtual display having a resolution within an adjustable range of resolutions is presented to the eye box. The adjustable range of resolutions includes the physical resolution of the electronic display. The ability to dynamically control both resolution and frame rate allows the NED assembly to mitigate consumption of system resources (e.g., power, memory, bandwidth, etc.) with minimal, if any, impact to a user's perception of the displayed content.

The NED assembly may be integrated into a head-mounted display (HMD). The HMD displays content to a user wearing the HMD, where the user's eyes would be located at respective eye boxes of the HMD. The HMD may be a component of an artificial reality system. For a given eye, the HMD generates a virtual display, using the NED assembly, at an eye box corresponding to a location of the eye. The HMD is able to dynamically adjust a resolution and/or frame rate of content presented by the virtual display.

Figure 1:
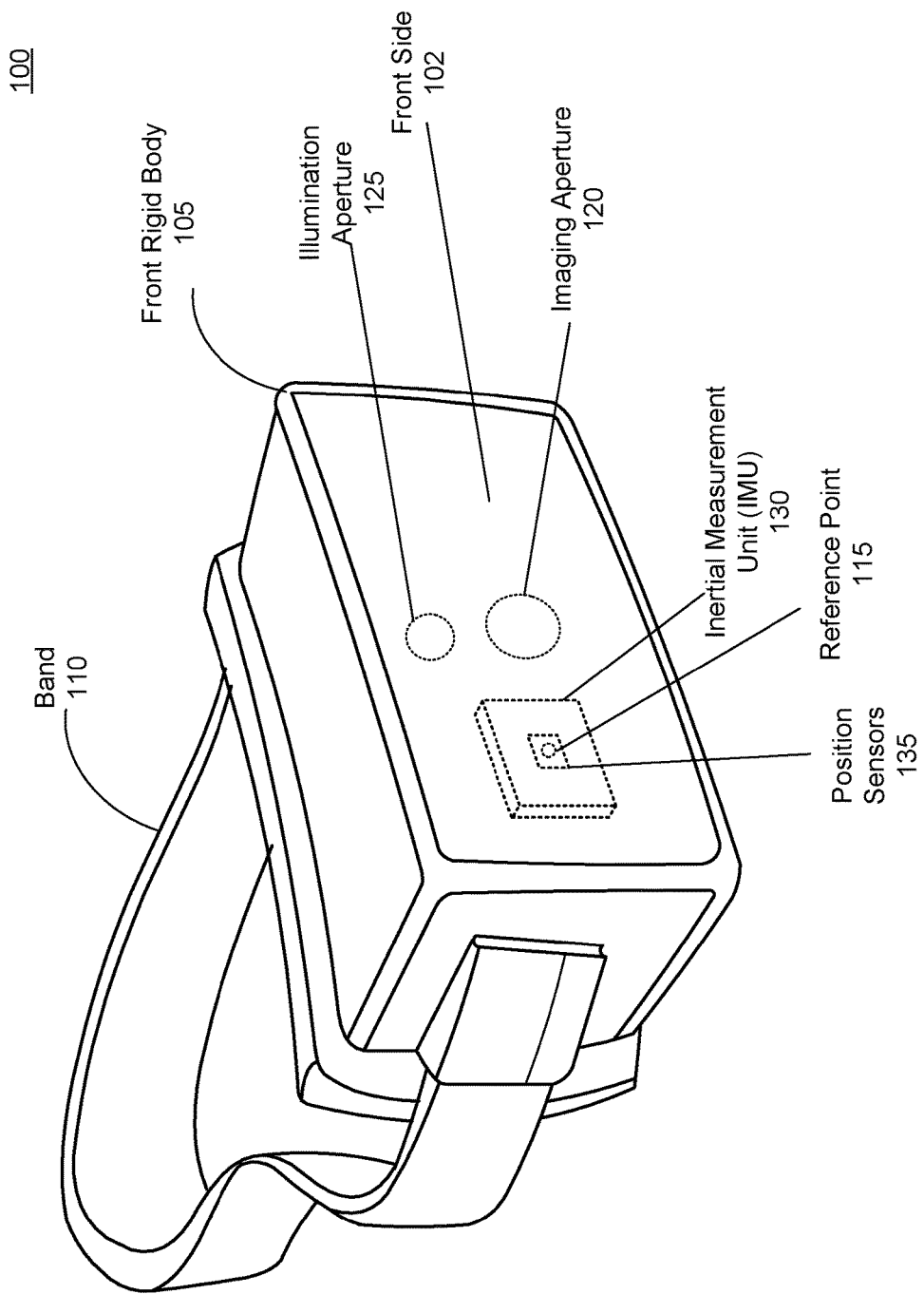
FIG. 1 is a perspective view of a head-mounted display (HMD), in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic sensation, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) assembly connected to a host computer system, a standalone HMD, a mobile device or computing system, or any other hardware platform capable of providing artificial reality content to one or more viewers.

Emerging applications require many improvements for electronic displays, such as higher resolution, faster frame-rates, smaller total size, lighter weight, lower-power, higher color gamut, etc. Embodiments of the present disclosure relate to an apparatus and methods for adjusting resolution and frame rate to accommodate different content for presentation to a viewing user. The apparatus and methods presented herein facilitate shifting a relative position of an electronic display to an optical assembly coupled to the electronic display during scanning of the electronic display to obtain a virtual display presented to an eye box having a virtual resolution within an adjustable range of resolutions which includes an original resolution of the electronic display, with a frame rate within an adjustable range of frame rates based in part on the display instructions.

A near-eye display (NED) assembly is configured to present visual content (e.g., generated visual content, real-world visual content, or some combination thereof) to a user of the HMD. The NED has an adjustable frame rate and an adjustable resolution. The NED assembly may be a component of a HMD of an artificial reality system. Embodiments of the NED assembly comprise an electronic display, an optical assembly, a scanning assembly, and a controller. The electronic display is configured to emit source light comprising a plurality of light rays. The source light has an inherent resolution based on a position of emitters that comprise the electronic display. In some embodiments, the emitters of the source light are sparsely populated on the source light. The electronic display emits source light with a certain refresh rate as well. The optical assembly is coupled to the electronic display so as to direct the source light from the electronic display to an eye box corresponding to a position of an eye of a viewing user.

The scanning assembly shifts some or all of the source light to generate a virtual display at the eye box according to display instructions by the controller. As discussed in detail below, the shifting of light may be caused by movement of the electronic display, movement of one or more optical elements (e.g., lenses) of the optical assembly, or some combination thereof. The generated virtual display has an adjustable resolution and an adjustable frame rate, wherein the resolution and the frame rate have an inversely proportional dependency.

The controller generates the display instructions based on the content to be presented so as to coordinate emission of source light and scanning by the scanning assembly to achieve a target resolution and frame rate. The adjustable resolution and adjustable frame rate provide an ability to present content at different resolutions and frame rates. For example, the NED assembly in one mode maximizes frame rate with a tradeoff of a lower resolution in the adjustable range of resolutions; whereas, in another mode, the NED assembly maximizes resolution with a tradeoff of lower frame rate in the adjustable range of frame rates. In other embodiments, the NED assembly can generate a virtual display with a portion of the virtual display having a first bit depth and a portion of the virtual display having a second bit depth.

FIG. 1A is a perspective view of a HMD 100, in accordance with one or more embodiments. The HMD 100 may be part of an artificial reality system. In embodiments that describe an AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105, a band 110, and a reference point 115. The HMD 100 may also include a depth camera assembly (DCA) configured to determine depth information of a local area surrounding some or all of the HMD 100. The HMD 100 may also include an imaging aperture 120 and an illumination aperture 125, and an illumination source of the DCA emits light (e.g., a structured light pattern) through the illumination aperture 125. An imaging device of the DCA captures light from the illumination source that is reflected from the local area through the imaging aperture 120.

The front rigid body 105 includes one or more near-eye display assemblies (not shown in FIG. 1), one or more integrated eye tracking systems (not shown in FIG. 1), an Inertial Measurement Unit (IMU) 130, one or more position sensors 135, and the reference point 115. In the embodiment shown by FIG. 1, the position sensors 135 are located within the IMU 130, and neither the IMU 130 nor the position sensors 135 are visible to a user of the HMD 100. The IMU 130 is an electronic device that generates IMU data based on measurement signals received from one or more of the position sensors 135. A position sensor 135 generates one or more measurement signals in response to motion of the HMD 100. Examples of position sensors 135 include: one or more accelerometers, one or more gyroscopes, one or more magnetometers, another suitable type of sensor that detects motion, a type of sensor used for error correction of the IMU 130, or some combination thereof. The position sensors 135 may be located external to the IMU 130, internal to the IMU 130, or some combination thereof.

Figure 2:
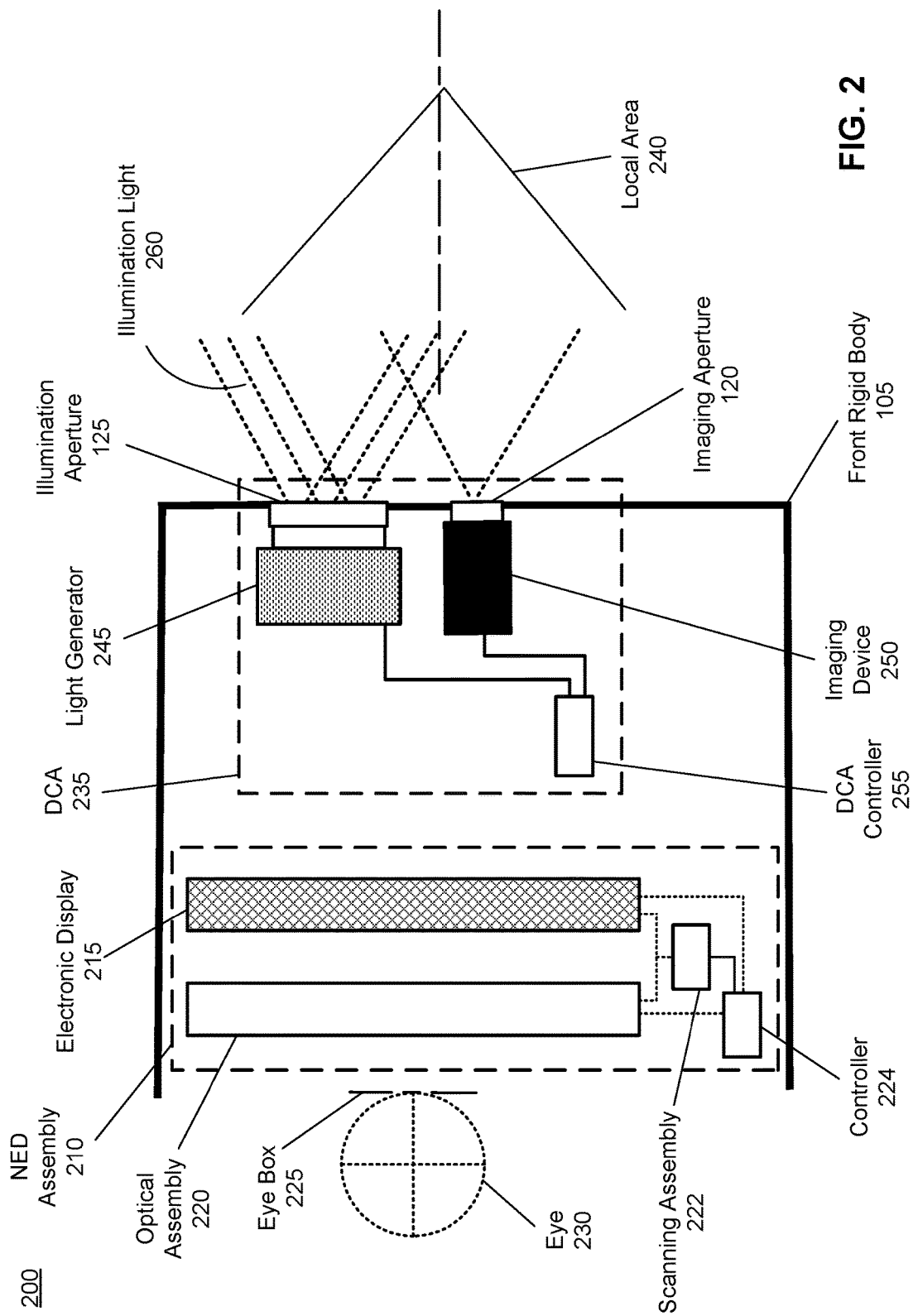
FIG. 2 is a cross sectional view of a front rigid body of the HMD of FIG. 1, in accordance with one or more embodiments.

FIG. 2 is a cross sectional view of a front rigid body of the HMD 100 of FIG. 1, in accordance with one or more embodiments. As shown in FIG. 2, the front rigid body 105 includes a near-eye display assembly 210 that comprises an electronic display 215 and an optical assembly 220. The near-eye display assembly 210 may be configured herein to adjust resolution and/or frame rate of image light output by the near-eye display assembly 210. In some embodiments, the near-eye display assembly 210 includes a two-dimensional electronic display 215 that emits image light being collimated by a lens system of the optical assembly 220. However, other architectures of the near-eye display assembly 210 are possible. The electronic display 215 and the optical assembly 220 together provide image light to an eye box 225. The scanning assembly 222 shifts a direction of one or more light rays emitted from the electronic display such that the image light provided has an adjustable resolution. The eye box 225 is a region in space that is occupied by a user's eye 230. For purposes of illustration, FIG. 2 shows a cross section 200 associated with a single eye 230, but another optical assembly 220, separate from the optical assembly 220, provides altered image light to another eye of the user at another eye box 225.

The electronic display 215 emits source light toward the optical assembly 220. In various embodiments, the electronic display 215 may comprise a single electronic display or multiple electronic displays (e.g., a display for each eye of a user). Examples of the electronic display 215 include: a liquid crystal display (LCD), an organic light emitting diode (OLED) display, an inorganic light emitting diode (ILED) display, an active-matrix organic light emitting diode (AMOLED) display, a transparent organic light emitting diode (TOLED) display, superluminous light emitting diode display, a laser diode display, a vertical cavity surface emitting laser (VCSEL) display, some other display, a projector, or some combination thereof. The electronic display 215 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display 215. In some embodiments, the electronic display 215 may have one or more coatings, such as anti-reflective coatings. More details about architecture of the electronic display 215 within the NED assembly 210 are provided in conjunction with FIGS. 3-5.

The optical assembly 220 receives source light emitted from the electronic display 215 and directs the source light to the eye box 225 of the user's eye 230. The optical assembly 220 also magnifies the received source light, corrects optical aberrations associated with the source light, and the corrected source light is presented to a user of the HMD 100. In some embodiments, the optical assembly 220 includes a collimation element (e.g., a lens) for collimating the plurality of light rays which comprise the source light emitted from the electronic display 215. At least one optical element of the optical assembly 220 may be an aperture, a Fresnel lens, a refractive lens, a reflective surface, a diffractive element, a waveguide, a filter, or any other suitable optical element that affects image light emitted from the electronic display 215. Moreover, the optical assembly 220 may include combinations of different optical elements. In some embodiments, one or more of the optical elements in the optical assembly 230 may have one or more coatings, such as anti-reflective coatings, dichroic coatings, polarizer coatings, etc. Magnification of the source light by the optical assembly 220 allows elements of the electronic display 215 to be physically smaller, weigh less, and consume less power than larger displays. Additionally, magnification may increase a field-of-view (FOV) of the displayed content. For example, the FOV of the displayed content is such that the displayed content is presented using almost all (e.g., 110 degrees diagonal), and in some cases all, of the user's FOV. In some embodiments, the optical assembly 220 is designed so its effective focal length is larger than the spacing to the electronic display 215, which magnifies the image light projected by the electronic display 215. Additionally, in some embodiments, the amount of magnification may be adjusted by adding or removing optical elements. More details about the optical assembly 220 and operation of the optical assembly 220 within the near-eye display assembly 210 are described in conjunction with FIG. 3.

The scanning assembly 222 shifts source light emitted from the electronic display 215 in accordance with display instructions such that a virtual display is presented to the eye box 225, wherein the virtual display has an adjustable range of resolution and an adjustable range of frame rate. The adjustable resolution can be achieved through shifting of a plurality of light rays to adjust separation of adjacent light rays. The scanning assembly 222 may include at least one positioner coupled to either the electronic display 215 or the optical assembly 220 for rapidly moving the electronic display 215 and/or the optical assembly 220 relative to one another. The scanning assembly is further described in conjunction with FIGS. 3-5.

The controller 224 managers operation of the other components in the NED assembly 210. The controller 224 generates display instructions based on content provided to the NED assembly for presentation to a wearing user of the HMD 100. The controller 224 determines a target frame rate and a target resolution based on the content. The controller 224 then generates display instructions to achieve the target frame rate and the target resolution. The display instructions includes instructions for the electronic display 215, the optical assembly 220, and the scanning assembly 222. Additionally, the display instructions specify a target color depth for the electronic display 215. The generation of the display instructions and the various embodiments of use of the display instructions is described further in conjunction with FIGS. 3-5.

In some embodiments, the front rigid body 105 further comprises an eye tracking system (not shown in FIG. 2) that determines eye tracking information for the user's eye 230. The determined eye tracking information may comprise information about a position (including orientation) of the user's eye 230 in the eye box 225, i.e., information about an angle of an eye-gaze. To eye tracking system may include one or more emitters and one or more detectors which measure light emitted towards the eye in order to ascertain changes in the light as measured by the detectors due to movement of the user's eyes. In one embodiment, the emitters of the eye tracking system illuminate the user's eye 230 with structured light. The eye tracking system can use locations of the reflected structured light in a captured image by the detectors to determine the position of the user's eye 230. In another embodiment, the eye tracking system determines the position of the user's eye 230 based on magnitudes of image light captured over a plurality of instants of time. The eye tracking system may relay eye tracking information which may influence parameters of the NED assembly to display content with varying resolution and frame rate.

In some embodiments, the front rigid body 105 further includes a DCA 235 for determining depth information of one or more objects in a local area 240 surrounding some or all of the HMD 100. The DCA 235 includes a light generator 245, an imaging device 250, and a DCA controller 255 that may be coupled to both the light generator 245 and the imaging device 250. The light generator 245 emits light through the illumination aperture 125. The light generator 245 illuminates the local area 240 with illumination light 260, e.g., in accordance with emission instructions generated by the DCA controller 255. The DCA controller 255 is configured to control, based on the emission instructions, operation of certain components of the light generator 245, e.g., to adjust an intensity and a pattern of the illumination light 260 illuminating the local area 240. In some embodiments, the illumination light may include a structured light pattern, e.g., dot pattern, line pattern, etc.

The light generator 245 may include a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the light generator 245 can emit one or more light beams.

The imaging device 250 includes one or more cameras configured to capture, through the imaging aperture 120, at least a portion of the illumination light 260 reflected from the local area 240. The imaging device 250 captures one or more images of one or more objects in the local area 240 illuminated with the illumination light 260. The DCA controller 255 coupled to the imaging device 250 is also configured to determine depth information for the one or more objects based on the captured portion of the reflected illumination light. In some embodiments, the DCA controller 255 provides the determined depth information to a console and/or an appropriate module of the HMD 100.

Figure 3:
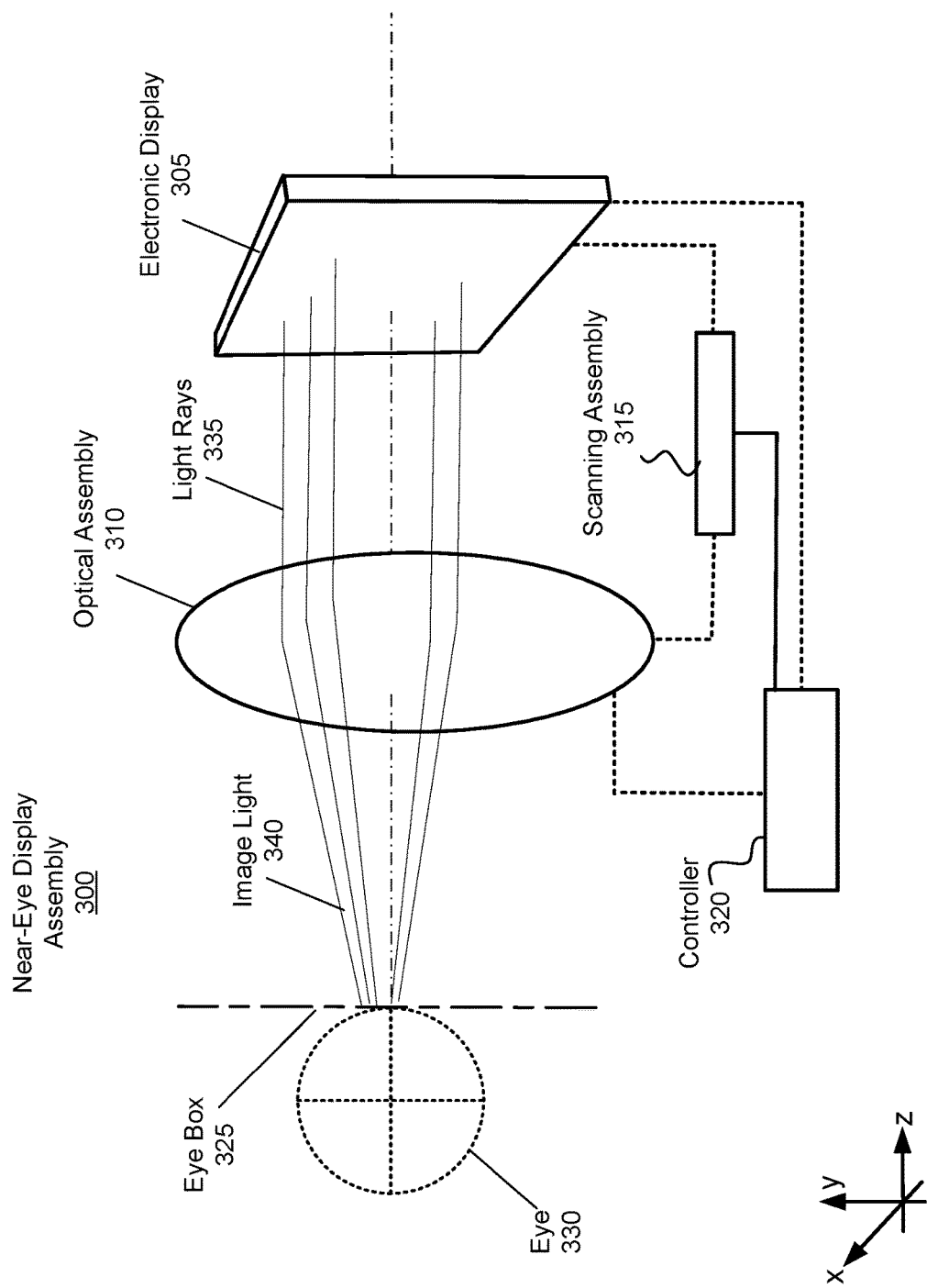
FIG. 3 illustrates a near-eye display (NED) assembly, in accordance with one or more embodiments.

FIG. 3 illustrates a NED assembly, in accordance with one or more embodiments. The NED assembly 300 may be configured herein to increase resolution and/or brightness of image light output by the NED assembly 300. The NED assembly 300 includes an electronic display 305, an optical assembly 310, a scanning assembly 315 coupled to at least one or both of the electronic display 305 and the optical assembly 310, and a controller 320 coupled to the scanning assembly 315. The NED assembly 300 has variable resolution and frame rate, and in some conditions may provide super resolution (i.e., a perceived number of emitters within the virtual display is greater than a physical number of emitters in the electronic display 305). The NED assembly 300 may be part of the HMD 100 in FIG. 1. Furthermore, the NED assembly 300 may be part of a HMD implemented as an eyeglass-type platform. In this case, the electronic display 305 of the NED assembly 300 may be also implemented as a waveguide based display. Additional details regarding artificial reality systems implemented as eyeglass-type platforms and waveguide based displays are discussed in, e.g., U.S. application Ser. No. 15/863,689, filed Jan. 5, 2018, U.S. application Ser. No. 15/682,294, filed Aug. 21, 2017, U.S. application Ser. No. 15/670,730, filed Aug. 7, 2017, and are herein incorporated by reference in their entireties. The NED assembly 300 may be an embodiment of the NED assembly 210 in FIG. 2; the electronic display 305 may be an embodiment of the electronic display 215 in FIG. 2; and the optical assembly 310 may be an embodiment of the optical assembly 220 in FIG. 2.

The electronic display 305 emits source light. In one embodiment, the electronic display 305 is implemented as an OLED display. In another embodiment, the electronic display 305 is implemented as an ILED display. However, other implementations of the electronic display 305 are also possible with various types of emitters. The electronic display 305 may comprise a two-dimensional array of emitters. Each emitter of the electronic display 305 may be implemented as a sub-pixel (not shown in FIG. 3) emitting light of a particular wavelength (color). For example, a sub-pixel of the electronic display 305 may emit red light, green light, or blue light. A pixel of the electronic display 305 then may be composed of multiple sub-pixels (e.g., three sub-pixels), wherein each sub-pixel in the pixel emits light of a different color. In some embodiments, the electronic display 305 is implemented as a full color display having a resolution of N pixels in a first dimension (e.g., x dimension) and M pixels in a second dimension (e.g., y dimension), i.e., a resolution of N×M pixels, where N and M are integers. The electronic display 305 may be thus composed of two-dimensional array of sub-pixels, wherein three consecutive sub-pixels in the electronic display 305 (e.g., along x dimension or y dimension) emitting light of different colors form a pixel of the electronic display 305 emitting white light of a particular intensity (brightness). As positioning of emitters relative to one another is static, there is an innate resolution to the electronic display 305 due to the positioning of emitters. Each emitter of the electronic display 305 can adjust its emission intensity at a refresh rate with a maximum refresh rate limited by the emitter characteristics. Color depth is defined as number of bits to define a color gradation of the electronic display 305. A higher color depth allows for a less discretized color spectrum. In some embodiments, the electronic display 305 can vary color depth for the virtual display by reducing resolution of the virtual display. By reducing color depth, the electronic display 305 can reduce power, memory, bandwidth, or some combination thereof consumption as a higher color depth use greater amounts of data. In some embodiments, a maximum refresh rate of the electronic display 305 corresponds to a maximum frame rate of the image light 340 presented at the eye box 325. For example, a maximum refresh rate of 240 fps allows for the emitters to adjust their emissions so as to produce a new frame at a frame rate of 240 fps.

In some embodiments, a resolution of the electronic display 305 may be below a threshold resolution, i.e., a number of pixels in each dimension may be below a threshold number per unit distance. In other embodiments, a resolution of the electronic display 305 may be above the threshold resolution, i.e., the number of pixels in each dimension may be above the threshold number per unit distance. The electronic display 305 can be referred to as a sparsely-populated electronic display when a distance between adjacent emitters is at least a size of an emission area of an emitter (and in many cases is multiple times larger than the size of the emission area of the emitter). The electronic display 305 can be referred to as a densely-populated electronic display when a distance between adjacent emitters is less than an emission area of an emitter. In one or more embodiments, each emitter position in the electronic display 305 may be occupied by one sub-pixel. The electronic display 305 can be then referred to as a fully-populated electronic display, which can be considered to be a special case of a densely-populated electronic display. In general, the electronic display 305 is implemented herein to have an innate resolution due to the emitter area and separation between adjacent emitters. More details about a pixel/sub-pixel arrangement within the electronic display 305 are provided in conjunction with FIG. 4.

The optical assembly 310 controls a FOV at an eye box 325 of an eye 330 and directs a plurality of light rays 335 of source light emitting from the electronic display 305 toward the eye box 325. The scanning assembly 315 is configured to shift directions of the light rays 335 in accordance with display instructions (e.g., provided by the controller 320) such that a virtual display is presented to the eye box 325, wherein the virtual display (not shown in FIG. 3) has an adjustable range of resolution. The adjustable resolution can be achieved through shifting of the plurality of light rays 335 such that the plurality of light rays 335 overlay to adjust separation of adjacent light rays. More details about principles utilized to adjust resolution being perceived at the eye box 325 is provided in conjunction with FIGS. 4 and 5.

In some embodiments, the optical assembly 310 includes one or more electro-optical elements (not shown in FIG. 3). In one or more embodiments, the one or more electro-optical elements of the optical assembly 310 include one or more electro-optical liquid deformable surfaces. Operation of the one or more electro-optical elements in the optical assembly 310 may include utilizing the one or more electro-optical elements to shift the directions of some of the light rays 335 emitted from the electronic display 305 to adjust resolution and/or brightness of the source light. In some other embodiments, the optical assembly 310 includes an optical prism, e.g., a fine wedge-shaped prism (not shown in FIG. 3). In one or more embodiments, the prism in the optical assembly 310 can be implemented as a spinning small angle prism, wherein a spinning angle of the prism can be controlled based in part on display instructions from the controller 325. By rotating the prism in the optical assembly 310 around an optical axis of the optical assembly 310 (e.g., based in part on the display instructions from the controller 320), the directions of the light rays 335 emitted from the electronic display 305 are shifted, thereby allowing for an increase in resolution with a tradeoff of frame rate in the virtual display at the eye box 325. In yet some other embodiments, the optical assembly 310 includes a collimation element or lens (not shown in FIG. 3) configured to collimate the light rays 335 received from the electronic display 305. By rotating the collimation element in the optical assembly 310 around an optical axis of the optical assembly 310 (e.g., based in part on the display instructions from the controller 320), the directions of the light rays 335 emitted from the electronic display 305 are shifted achieving a similar effect of being able to increase in resolution with a tradeoff of frame rate in the virtual display.

In some embodiments, the scanning assembly 315 is configured to shift the directions of the light rays 335 emitted from the electronic display 305 by shifting a relative position of the electronic display 305 to the optical assembly 310 in accordance with the display instructions (e.g., from the controller 320) at each time sample of a plurality of time samples in a time period of scanning the electronic display 305. The scanning assembly 315 may include at least one positioner coupled to the electronic display 305 for rapidly moving the electronic display 305 and/or at least one component (e.g., lens) of the optical assembly 310 along x dimension and/or y dimension during the scanning, thereby shifting the relative position of the electronic display 305 to the optical assembly 310 and increasing resolution of image light at the eye box 325. In one or more embodiments, each positioner of the scanning assembly 315 is implemented as a micro-actuator configured to move the electronic display 305 and/or the at least one component of the optical assembly 310. Furthermore, in one embodiment, at least one positioner of the scanning assembly 315 is configured to rotate the prism of the optical assembly 310 around an axis of the optical assembly 310 to shift the directions of the light rays 335 emitted from the electronic display 305, thereby increasing resolution of the image light 340 at the eye box 325. In other embodiments, at least one positioner of the scanning assembly 315 is configured to rotate the collimation element of the optical assembly 310 around an axis of the optical assembly 310 to shift the directions of the light rays 335 emitted from the electronic display 305, thereby increasing resolution of the image light 340 at the eye box 325. In some other embodiments, at least one positioner of the scanning assembly 315 can be configured to shift the electronic display 305 and/or the at least one component of the optical assembly 310 and to rotate at least one other component of the optical assembly 310 during a time period (or control in some other manner operation of the other component of the optical assembly 310), thereby shifting directions of the light rays 335 emitted from the electronic display 305 and increasing resolution of the image light 340 at the eye box 325. Additional details regarding the scanning assembly and methods to enhance display resolution are discussed in U.S. application Ser. No. 15/898,140, filed Feb. 15, 2018, and is herein incorporated by reference in its entirety. In some embodiments, the methods described therein may be modified to dynamically control resolution of presented content.

The controller 320 manages operation of one or more components of the NED assembly 300. Management of the one or more components of NED assembly 300 includes generating display instructions to shift of the plurality of light rays emitted from the electronic display by the scanning assembly 315 and display instructions to emit the plurality of light rays by the electronic display 305. The electronic display 305 may emit the plurality of light rays in accordance with the display instructions from the controller 320. In some embodiments, the controller 320 is coupled, via the scanning assembly 315, to at least one of the electronic display 305 and the optical assembly 310. Thus, the scanning assembly 315 may operate as an electrical or electro-mechanical interface between the controller 320 and at least one of the electronic display 305 and the optical assembly 310. The controller 320 determines a resolution and a frame rate of the image light 340 shown to the eye box 325 by the NED assembly 300 and then generates the display instructions to achieve the determined resolution and frame rate. As mentioned above, the controller 320 can balance a tradeoff between the two—resolution and frame rate, thereby, allowing the controller 320 to adjust both resolution and frame rate of the image light 340 as presented to the eye box 325 by the NED assembly 300. This tradeoff is due to an inverse dependency of the resolution on the frame rate. In some embodiments, the controller 320 can control a color depth of the content as well. As color depth depends on number of bits or light rays per refresh rate which are used to constitute a pixel of a certain wavelength in the virtual display, the controller 320 can generate display instructions so as to vary color depth. Various applications in which the controller 320 adjusts resolution, frame rate, and/or color depth are described in the paragraphs that follow.

One application with which the controller 320 can adjust both resolution and frame rate is with content including an object moving faster than a threshold value. Content to be presented by the NED assembly 300 may include various objects that are each travelling at varying speeds. The controller 320 determines whether at least one object in FOV of the virtual display is moving faster than a threshold value, e.g. speed which may be calculated as displacement of a threshold number of pixels in a unit of time. If so, the controller 320 generates display instructions so as to increase frame rate of the virtual display while reducing resolution due to the tradeoff between the two. An object moving faster than a threshold value can occur in many ways. In one instance, the NED assembly 300 is stationary and content is independent from movement of the NED assembly 300, but the content includes an object moving faster than the threshold value, such that the controller 320 increases frame rate. The increased frame rate of fast moving objects provides a more seamless movement of the object in the virtual display which provides a more immersive experience to a user. Without increasing the frame rate of a fast moving object, the user may experience chopped up movement of the fast moving object across the virtual display. Similarly, having a high resolution at the same time may have diminishing returns in improving user experience. In contrast, the NED assembly 300 is able to dynamically lower resolution (and also dynamically control the frame rate) to, e.g., reduce consumption of system resources (e.g., bandwidth, power, memory, etc.). For example, the NED assembly 300 operates with a frame rate of 24 frames per second (fps) or 30 fps for presenting a movie with the NED assembly 300. In another example, the NED assembly 300 reduces frame rate but increases resolution for presenting text content. In an additional example, the NED assembly 300 increases frame rate (e.g., to 60 fps or greater) when displaying an animated content to improve movement of the animated objects.

Another instance is if the NED assembly 300 (or the HMD in which the NED assembly 300 is implemented) is moving which causes an object in the artificial reality environment to move faster than the threshold value. The controller 320 may determine movement of the NED assembly 300 (or the HMD) through use of additional motion sensors, position sensors, accelerometers, other sensors to detect movement, etc. In an example of this is if a user moves the user's head quickly, objects in the artificial environment move relative to the user's head movement. In some embodiments, the controller 320 upsamples the content to a higher frame rate through generating synthetic frames to augment the content. In order to generate a synthetic frame, the controller 320 takes two adjacent frames from a content item and produces a synthetic frame to move from the first frame to the second frame. In one embodiment, the controller 320 averages the two adjacent frames to determine the synthetic frame. In additional embodiments, the controller 320 generates multiple synthetic frames between two adjacent frames from a content item for increasing the frame rate even more than with a single synthetic frame. Additional details regarding upsampling of content by generating synthetic frames are discussed in U.S. application Ser. No. 15/907,104, filed Feb. 27, 2018, and is herein incorporated by reference in its entirety. Increasing the frame rate (e.g., to 50 fps or greater) not only helps to reduce chopped up movement of objects in the FOV but also helps with peripheral rendering of content in the FOV. Peripheral rendering speed helps to reduce dizziness experienced by users when content is rendered with movement of the NED assembly 300 (or HMD).

Another application which the controller 320 can adjust both resolution and frame rate is with a frame rate adjustment flag encoded within the instructions for presentation of a content item. While the controller 320 determines if an object is moving faster than a threshold value in the application described above, in this application the controller 320 encounters a frame rate adjustment flag encoded within the instructions for presentation of the content item, wherein the frame rate adjustment flag describes a desired adjustment in frame rate. The controller 320 determines a target frame rate based in part on the frame rate adjustment flag. To achieve the target frame rate, the controller 320 can increase or decrease frame rate of the content. For increasing frame rate, the controller 320 may generate synthetic frames as discussed above. For decreasing frame rate, the controller 320 may remove frames from the content with a certain frequency, e.g., removing every second frame. The controller 320 can also create synthetic frames from the content for decreasing frame rate. For example, the controller 320 takes multiple frames and generates synthetic frames with the multiple frames; however, the controller 320 generates less synthetic frames then there are frames in the content.

In other embodiments, the controller 320 generates display instructions such that the image light 340 of the virtual display has portions with varying resolution and/or color depth. One application of this principle is within content that has static objects and fast moving objects where the NED assembly 300 can provide the image light 340 so as to have a high resolution for the frame but specifically lower resolution for the fast moving objects while maintaining higher resolution for the static objects so as to optimize power usage. As a user is unlikely to detect low resolution images in the fast moving objects, the NED assembly 300 is able to reduce consumption of system resources (e.g., memory, power, bandwidth, etc.).

In one realistic example, a document type content item may have borders (i.e., white borders, decorated borders, borders with insignia) on either side with items (i.e., text, images, links) in between the borders. As a user scrolls through the content item, the controller 320 generates display instructions so as to render the document with a high frame rate to smooth the scrolling but reduces resolution in the scrolled portion while maintaining a higher resolution for the borders. In an alternate embodiment, the controller 320 can adjust a color depth of content in one portion of the virtual display to be different from a color depth of content in another portion. In one example, the controller 320 can adjust a color depth of the borders in the document type content item (described above) so as to be smaller with solid blocks in the virtual display being of one color. As such, the controller 320 can reduce a color depth of the borders i.e., if the borders are white, grey, black, one color, monochromatic, simple colors, etc.

In an alternative embodiment from that described above, the NED assembly 300 (or the HMD in which it is implemented) contains an eye tracking system for foveated rendering of the content, such as the eye tracking system described in FIG. 1. The eye tracking system tracks eyes of a user of the NED assembly 300 as eye tracking information. The eye tracking information may specify a gaze of the user's eyes towards a portion of the virtual display. With the eye tracking information, the controller 320 may generate display instructions so as to render a portion of the virtual display corresponding to the eye tracking information with either maximum resolution and/or maximum frame rate. The remaining portions of the virtual display may be rendered to have a lower resolution and/or lower frame rate. This may be of a benefit in lowering power consumption of the NED assembly 300 as in some cases the NED assembly 300 does not utilize as much power rendering content at a lower resolution and/or lower frame rate as would, e.g., a display that renders content at a fixed resolution and frame rate content. In one implementation, the controller 320 creates a resolution profile mapping to various portions of the virtual display within a FOV of the eye box 325 so as to determine resolution as a radial function away from the gaze of the user. In one embodiment, the controller 320 can generate display instructions and scanning instruction so as to produce a virtual display with annular portions which gradually decrease in resolution and/or frame rate.

To accomplish the various application described above, the controller 320 may generate display instructions for at least one positioner of the scanning assembly 315 (e.g., at least one micro-actuator) to shift the relative position of the electronic display 305 to the optical assembly 310 during the time period of raster scanning. In one or more embodiments, the controller 320 instructs at least one positioner in the scanning assembly 315 to shift the electronic display 305 and/or the optical assembly 310 along x dimension and/or y dimension during the time period, based in part on the display instructions. In some embodiments, when the electronic display 315 is implemented as a sparsely populated display, the controller 320 instructs the at least one positioner in the scanning assembly 315 to move the electronic display 305 and/or the optical assembly 310 along x dimension and y dimension during the time period, based in part on the display instructions. In this manner, the scanning assembly 315 would shift the electronic display 305 and/or the optical assembly 310 in orthogonal directions to provide raster scanning and populate the virtual display presented to the eye box 325 with an increased sub-pixel/pixel density, thereby also increasing resolution. Similarly, an adjustment in sub-pixel density can correlate to increase in color depth of the virtual display presented at the eye box 325. More details about this approach for increasing the virtual display resolution are provided in conjunction with FIGS. 4 and 5. In other embodiments, when the electronic display 305 is implemented as a densely-populated display, the controller 320 instructs, based in part on the display instructions, the scanning assembly 315 to translate the electronic display 305 and/or the optical assembly 310 linearly along orthogonal paths (i.e., x and y dimensions) using at least one positioner of the scanning assembly 315 to effectively shift the electronic display 305 and/or the optical assembly 310 around in a circular path during a time period of translational movement. In this manner, the densely-populated electronic display 315 is presented at the eye box 325 as the virtual display having an increased sub-pixel/pixel density, thereby also increasing resolution and/or color depth.

In another implementation, the controller 320 is configured to instruct the at least one positioner of the scanning assembly 315 to rotate the prism within the optical assembly 310 around an axis of the optical assembly 310 to shift the directions of the light rays 335, based in part on the display instructions, thereby increasing resolution and/or color depth of the virtual display at the eye box 325. In other embodiments, the controller 320 instructs the at least one positioner of the scanning assembly 315 to rotate the collimation element of the optical assembly 310 around an axis of the optical assembly 310 to shift the directions of the light rays 335, based in part on the display instructions, thereby increasing resolution and/or color depth of the virtual display at the eye box 325.

In another implementation, the controller 320 is directly interfaced with one or more components of the optical assembly 310. In one or more embodiments, the controller 320 is directly interfaced with one or more electro-optical elements of the optical assembly 310, e.g., one or more electro-optical liquid deformable surfaces. The controller 320 may be then configured to control operation of the one or more electro-optical elements in the optical assembly 310 based in part on the display instructions to shift the directions of the light rays 335 emitted from the electronic display 305. For example, the controller 320 may control a level of voltage applied to each electro-optical liquid deformable surface in the optical assembly 310 to change a refractive index of that surface and shift the directions of the light rays 335 emitted from the electronic display 305. In other embodiments, the controller 320 is configured to control the operation of the scanning assembly 315 (e.g., of the at least one positioner in the scanning assembly 315) to control a brightness of a virtual pixel of the virtual display at the eye box 325 based on a number of times over a time period a location at the eye box 325 corresponding to the virtual pixel receives one or more light rays of the plurality of light rays 335 associated with a particular sub-pixel color emitted from the electronic display 305.

Furthermore, in some implementations, when the electronic display 315 is implemented as a sparsely populated display, the controller 320 instructs the at least one positioner of the scanning assembly 315 during a time period to control operation of at least one component (e.g., prism, collimation element, or electro-optical element) of the optical assembly 310 as well as to rapidly move the electronic display 305 and/or at least one other component of the optical assembly 310 along x dimension and y dimension, based in part on the display instructions. In this manner, the sparsely-populated electronic display 315 is presented at the at the eye box 325 as the virtual display having an increased sub-pixel/pixel resolution. In some other embodiments, when the electronic display 315 is implemented as a densely-populated display, the controller 320 instructs the at least one positioner of the scanning assembly 315 during the time period to control operation of at least one component (e.g., prism, collimation element, or electro-optical element) of the optical assembly 310 as well as to rapidly translate the electronic display 305 and/or at least one other component the optical assembly 310 linearly along orthogonal paths to effectively shift the electronic display 305 and/or the optical assembly 310 around in a circular path. In this manner, the densely-populated electronic display 315 is presented at the at the eye box 325 as the virtual display having an increased sub-pixel/pixel resolution.

Although the various implementations described above describe methods of increasing sub-pixel/pixel density, thereby increasing resolution and/or color depth, the controller 320 may generate display instructions for the electronic display 305, the optical assembly 310, and/or the scanning assembly 315 to contrarily decrease resolution but increase frame rate by diverting sub-pixel/pixel density into an increased number of frames per unit time.

Figure 4:
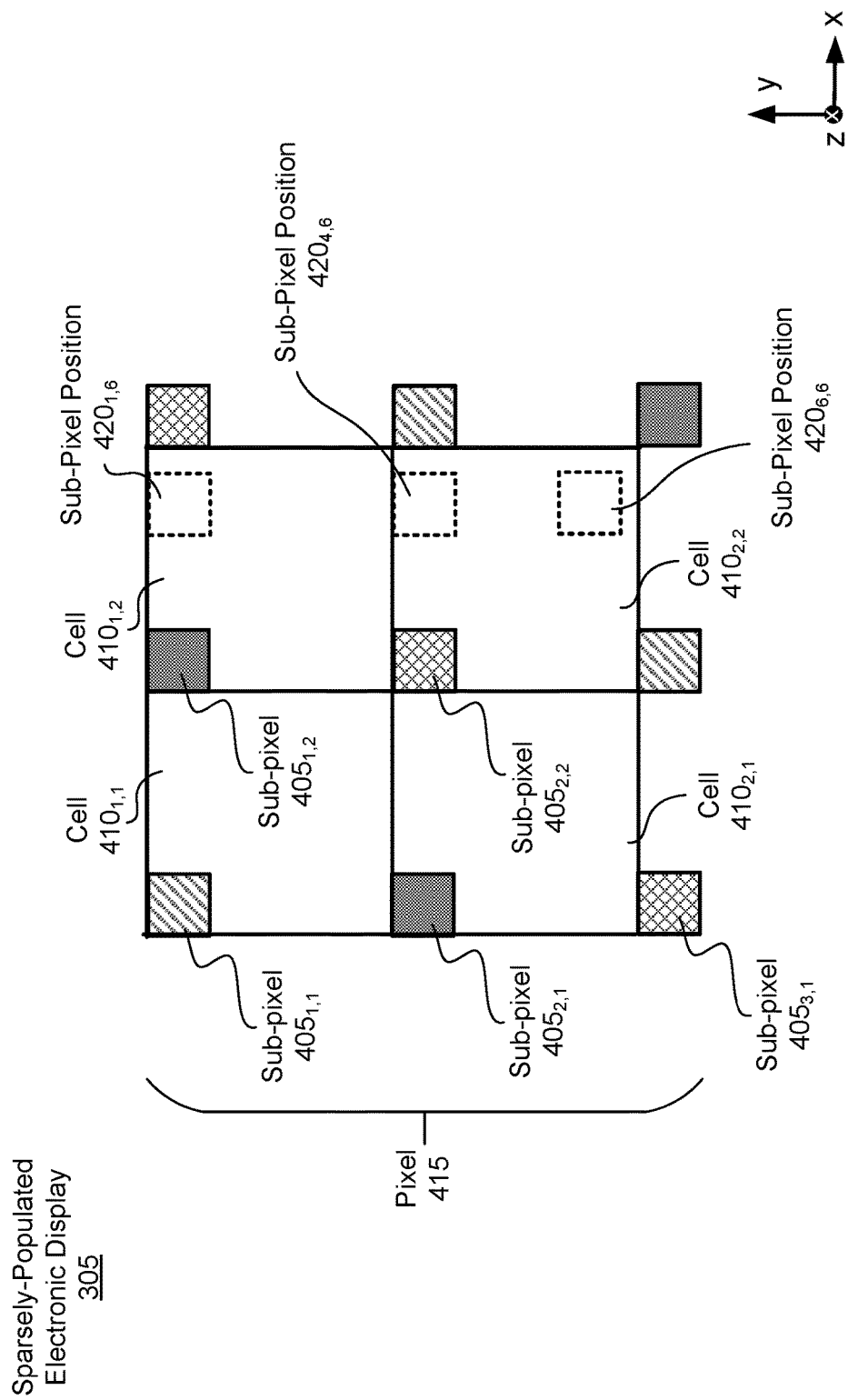
FIG. 4 is a planar view of a portion of an electronic display for the near-eye display assembly, in accordance with one or more embodiments.

FIG. 4 is a planar view of a portion of an electronic display 305 for the near-eye display assembly, in accordance with one or more embodiments. The electronic display 305 which in these embodiment is implemented as a sparsely-populated electronic display. The sparsely-populated electronic display 305 comprises a plurality of sub-pixels $405_{i,j}$, i=1, 2, 3, . . . , N and j=1, 2, . . . , M. The electronic display 305 (portion of which is shown in FIG. 4) is referred to as a sparsely-populated electronic display since a distance between adjacent sub-pixels $405_{i,j}$ and $405_{i,j+1}$ (or $405_{i,j}$ and $405_{i+1,j}$) is larger than a size of an emission area of a sub-pixel $405_{i,j}$. Note that, for simplicity and without losing generality, an emission area of a sub-pixel $405_{i,j}$ is referred to as the sub-pixel $405_{i,j}$ in FIG. 4. Each sub-pixel $405_{i,j}$ is located in a different cell $410_{i,j}$. Each cell $410_{i,j}$ may occupy a two-dimensional area (e.g., square-shaped area) with sub-pixel positions (e.g., three sub-pixel positions) along x and y dimensions. As shown in FIG. 4, each sub-pixel $405_{i,j}$ is located in an upper left sub-pixel position within a cell $410_{i,j}$. However, other positions of a sub-pixel $405_{i,j}$ within a cell 410, are possible. In some embodiments, for the multichromatic sparsely-populated electronic display 305, each sub-pixel $405_{i,j}$ is implemented to emit light of a particular color (e.g., red, green or blue color). Three consecutive sub-pixels (either along x dimension or along y dimension) emitting light of different colors (e.g., red, green and blue colors) represent a pixel 415 of the sparsely-populated electronic display 305. For example, as shown in FIG. 4, the pixel 415 is composed of sub-pixels $405_{1,1}$, $405_{2,1}$, and $405_{3,1}$ of different color channels. In some other embodiments, for the monochromatic sparsely-populated electronic display 305, each sub-pixel $405_{i,j}$ is implemented to emit light of the same color.

In the illustrative embodiment shown in FIG. 4, each sub-pixel $405_{i,j}$ (i=1, 2; j=1, 2) would fill 36 different sub-pixel positions $420_{m,n}$ (m=1, 2, . . . , 6; n=1, 2, . . . , 6), e.g., 9 sub-pixel positions in each cell $410_{i,j}$. In this manner, a space that spans adjoining cells $410_{i,j}$ (i=1, 2; j=1, 2) shown in FIG. 4 is filled by a densely-populated array of sub-pixels where each sub-pixel position $420_{m,n}$ in a cell $410_{i,j}$ is occupied by one sub-pixel $405_{i,j}$ during raster scanning. A number of different sub-pixel positions to be filled in each cell $410_{i,j}$ during raster scanning can be different in different embodiments. At a beginning of raster scanning, each sub-pixel $405_{i,j}$ is located at an initial position, e.g., an upper left sub-pixel position within a cell $410_{i,j}$. During the raster scanning, that sub-pixel $405_{i,j}$ would fill every sub-pixel position $420_{m,n}$ in six columns and six rows adjacent to the initial position during a time period of the raster scanning (e.g., sub-pixel positions $420_{1,6}$, $420_{4,6}$, $420_{6,6}$ in FIG. 4 are example raster locations of each sub-pixel $405_{i,j}$), as discussed in more details in conjunction with FIG. 5.

In some embodiments, as discussed in conjunction with FIG. 3, the sparsely-populated electronic display 305 can be perceived as a fully populated virtual display presented to the eye box 325 by shifting directions of the light rays 335 emitted from the sparsely-populated electronic display 305. The directions of the light rays 335 may be shifted by shifting a relative position of the sparsely-populated electronic display 305 to the optical assembly 310 (not shown in FIG. 4) in accordance with display instructions at each time sample of a plurality of time samples in a time period of raster scanning. The relative position of the sparsely-populated electronic display 305 to the optical assembly 310 may be shifted along x dimension and y dimension in a pattern that allows rendering of an image at a resolution of a densely-populated display, as being perceivable at the eye box 325.

Figure 5:
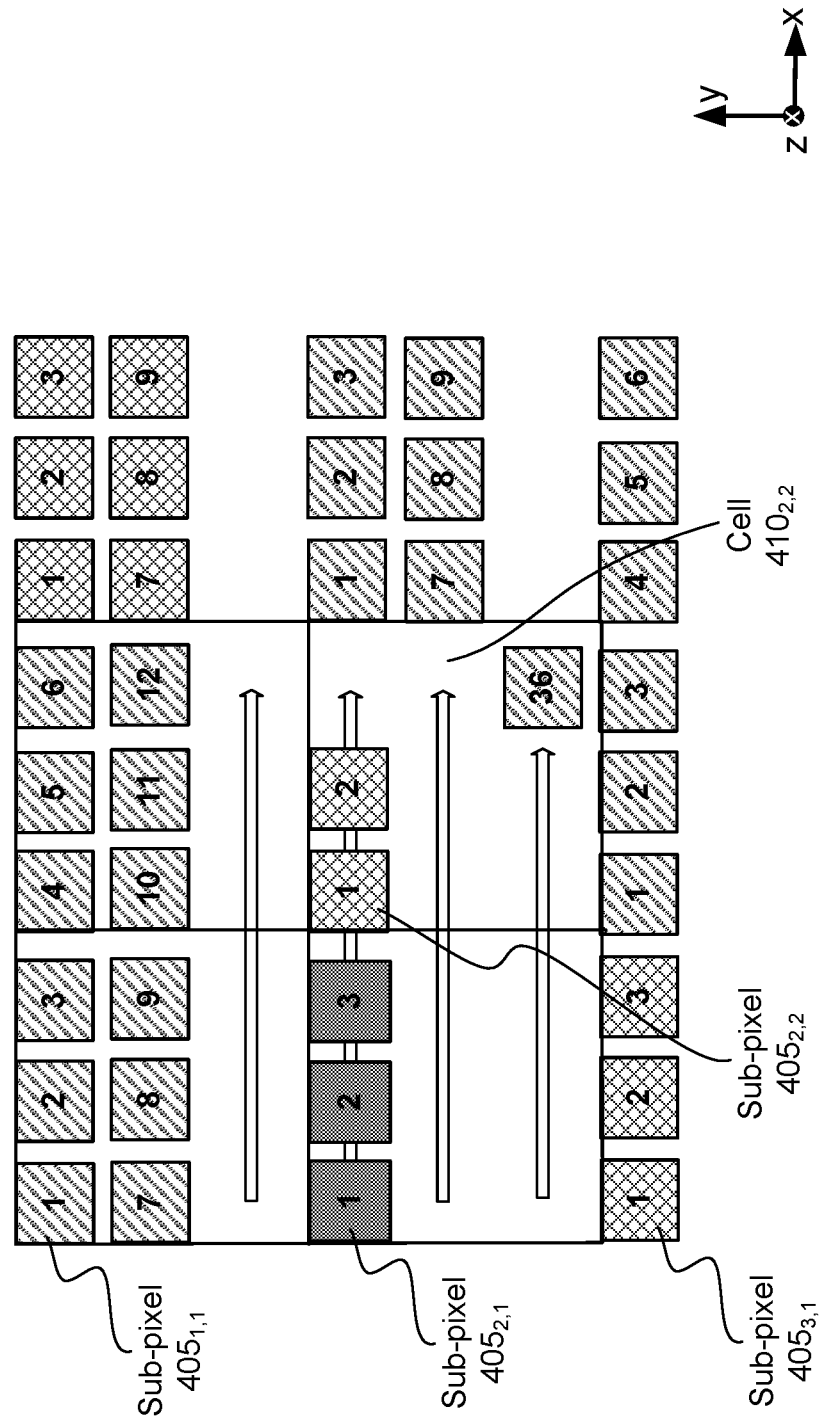
FIG. 5 illustrates a raster-scanning motion path associated to populate a virtual display, in accordance with one or more embodiments.

FIG. 5 illustrates a raster-scanning motion path associated to populate a virtual display, in accordance with one or more embodiments. Numbers 1, 2, . . . , 36 shown in FIG. 5 represent optical locations of each sub-pixel 405$_{i,j}$ starting from an initial position (i.e., location 1) as the array of sub-pixels 405$_{i,j}$ (i=1, 2, 3, . . . , N and j=1, 2, . . . , M) is raster scanned during a given time period. Each of the numbers 1, 2, . . . , 36 shown in FIG. 5 thus represents an optical location of each sub-pixel 405$_{i,j}$ at a particular time sample of the time period of raster scanning. Note that the optical locations 1, 2, . . . , 36 in FIG. 5 are associated with sub-pixel positions 420$_{m,n}$ (m=1, 2, . . . , 6; n=1, 2, . . . , 6) of FIG. 4 occupied by a sub-pixel 405$_{i,j}$ during raster scanning. In the illustrative embodiment of FIG. 5, the time period of raster scanning is composed of 36 time samples. However, this may be different for different embodiments. Note that only a portion of raster-scanning motion path of each sub-pixel 405$_{i,j}$ is illustrated in FIG. 5 for the sake of clarity.

The scanning assembly 315 of the near-eye display assembly of FIG. 3 is configured to shift the directions of the light rays emitted from the sparsely-populated electronic display 305 by shifting a relative position of the sparsely-populated electronic display 305 to the optical assembly 310 in accordance with the display instructions by one sub-pixel position in the cell 410$_{i,j}$ at each time sample of a plurality of time samples in a time period of raster-scanning. In some embodiments, the scanning assembly 315 shifts the sparsely-populated electronic display 305 in accordance with the display instructions along x dimension or y dimension at each time sample during the time period of raster-scanning. As shown in FIG. 5, the sparsely-populated electronic display 305 is shifted along x dimension or y dimension by one sub-pixel position at each time sample during the time period of raster scanning. Ensuring that sub-pixels are switched appropriately at each time sample of the time period of raster scanning to render images correctly (e.g., via electronic drivers in the scanning assembly 315), the light rays are emitted from each sub-pixel position of the sparsely-populated electronic display 305 along x dimension and y dimension. Thus, the sparsely-populated electronic display 305 is essentially transformed into a fully populated virtual display presented to the eye box 325.

In some embodiments, for the multi-chromatic sparsely-populated electronic display 305, the scanning is fast enough such that the eye 330 integrates light from three different neighboring sub-pixels of different color channels (e.g., sub-pixels 405$_{i,j}$, 405$_{i+1, j}$ and 405$_{i+1, j+1}$) that occupy the same sub-pixel position (e.g., upper-left corner) in a cell (e.g., cell 410$_{i+1,j+1}$) at different time instants. The three different sub-pixels occupying the same sub-pixel position in the cell at different time instants would form a virtual RGB sub-pixel of the same size as a single color channel sub-pixel 405$_{i,j}$. In this manner, a virtual RGB sub-pixel representing a white pixel can be provided at a sub-pixel position of the sparsely-populated electronic display 305. This would be the case for majority of sub-pixels 405$_{i,j}$ of the sparsely-populated electronic display 305, whereas the exception is the periphery of the sparsely-populated electronic display 305 where there is at most two color channels per virtual sub-pixel. In some other embodiments, for the monochromatic sparsely-populated electronic display 305, the eye 330 integrates light from three different neighboring sub-pixels (e.g., sub-pixels 405$_{i,j}$, 405$_{i+1,j}$ and 405$_{i+1,j+1}$) that occupy a sub-pixel position (e.g., upper-left corner) in a cell (e.g., cell 410$_{i+1,j+1}$) at different time instants such that a brightness of light emitted from the sub-pixel position is increased.

In the illustrative embodiment of FIG. 5, the sub-pixel 405$_{1,1}$ of a first color channel occupies the upper-left sub-pixel position of the cell 410$_{2,2}$ in the time instant 22 of the scanning time period (e.g., each scanning time period having 36 time instants); the sub-pixel 405$_{2,1}$ of a second color channel occupies the upper-left sub-pixel position of the cell 410$_{2,2}$ in the time instant 4 of the scanning time period; and the sub-pixel 405$_{2,2}$ of a third color channel occupies the upper-left sub-pixel position of the cell 410$_{2,2}$ in the first time instant of the scanning time period. Thus, the three different sub-pixel 405$_{1,1}$, 405$_{2,1}$, and 405$_{2,2}$ occupies the same sub-pixel position at different time instants and form a virtual RGB sub-pixel. The eye 330 integrates light from three different color channels, and perceives the intergraded light as emitted from a single virtual RGB sub-pixel. A plurality of virtual RGB sub-pixels make up the virtual display with enhanced resolution at the eye box 325.

In other embodiments, as discussed in conjunction with FIG. 3, the same effect of enhanced resolution at the eye box 325 can be achieved when the scanning assembly 315 shifts a relative position of the sparsely-populated electronic display 305 to the optical assembly 310 in accordance with the display instructions by shifting the optical assembly 310 along x dimension or y dimension at each time sample during the time period of raster-scanning. The optical assembly 310 coupled to the sparsely-populated electronic display 305 may be shifted along x dimension or y dimension by one sub-pixel position in a cell 410$_{i,j}$ at each time sample during the time period of raster scanning. In this manner, directions of each light ray emitted from the sparsely-populated electronic display 305 is optically shifted by one sub-pixel position at each time sample during the time period of raster scanning. Ensuring that sub-pixels are switched appropriately at each time sample of the time period of raster scanning to render images correctly (e.g., via electronic drivers in the scanning assembly 315), light rays are emitted from each sub-pixel position of the sparsely-populated electronic display 305 along x dimension and y dimension. Thus, by moving one or more components of the optical assembly 310, the sparsely-populated electronic display 305 is essentially transformed into a fully populated virtual display presented to the eye box 325.

In yet other embodiments, as discussed in conjunction with FIG. 3, the controller 320 controls operation of the one or more electro-optical elements of the optical assembly 310 (e.g., one or more electro-optical liquid deformable surfaces) to shift directions of light rays emitted from the sparsely-populated electronic display 305 along x dimension or y dimension by one sub-pixel position at each time sample during the time period of raster-scanning. Ensuring that sub-pixels are switched appropriately at each time sample of the time period of raster scanning to render images correctly (e.g., via electronic drivers in the scanning assembly 315), light rays are emitted from each sub-pixel position of the sparsely-populated electronic display 305 along x dimension and y dimension. Thus, by controlling operation of one or more electro-optical elements of the optical assembly 310, the sparsely-populated electronic display 305 is essentially transformed into a fully populated virtual display presented to the eye box 325. In yet other embodiments, the controller 320 controls operation of the one or more electro-optical elements of the optical assembly 310 in combination with instructing the scanning assembly 315 to move the sparsely-populated electronic display 305 and/or the optical assembly 310 for performing the raster-scanning motion path shown in FIG. 5, such that a resolution of a virtual display presented at the eye box 325 is enhanced.

Figure 6:
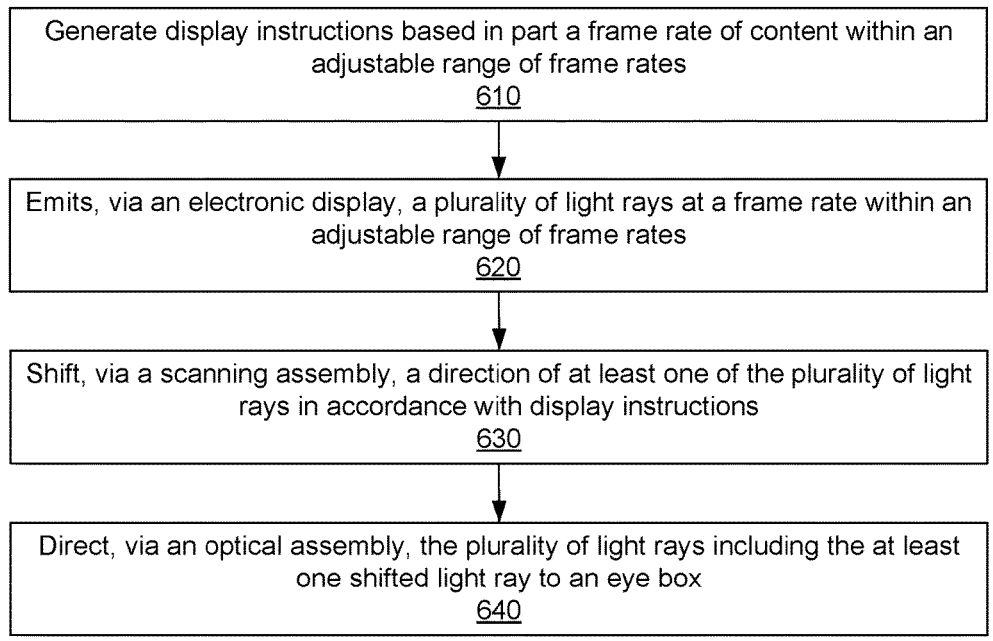
FIG. 6 is a flowchart describing a process for presenting content with adjustable resolution and frame rate, in accordance with one or more embodiments.

FIG. 6 is a flowchart describing a process 600 for presenting content with adjustable resolution and frame rate, in accordance with one or more embodiments. The process 600 of FIG. 6 may be performed by a NED assembly (e.g., the NED assembly 300). Other entities may perform some or all of the steps of the process in other embodiments. Likewise, embodiments may include different and/or additional steps, or perform the steps in different orders.

The NED assembly generates 610 display instructions based in part on a frame rate of content within an adjustable range of frame rates. The NED assembly takes content to be presented and determines a frame rate and a resolution to present the content. The NED assembly generates 610 display instructions so as to achieve the frame rate and the resolution. Within the display instructions, the NED assembly may specify instructions for operation of an electronic display, an optical assembly, and a scanning assembly . . . .

The NED assembly emits 620, via the electronic display (the electronic display 305) a plurality of light rays at the frame rate within the adjustable range of frame rates in accordance with display instructions. The electronic display comprises a plurality of emitters, wherein each emitter may constitute a sub-pixel. A physical resolution of the electronic display is based on configuration of the plurality of emitters, specifically depending on separation between adjacent emitters. The electronic display can vary in color depth and/or resolution (i.e., treating adjacent pixels as a single pixel), with a tradeoff between the two. Note that resolution is also adjusted by movement of the electronic display relative to an optical assembly (e.g., the optical assembly 310)—as described in the following step. The electronic display emits a plurality of light rays based on the display instructions.

The NED assembly shifts 630, via a scanning assembly (e.g., the scanning assembly 315), a direction of at least one of the plurality of light rays in accordance with display instructions. The scanning assembly of the NED assembly is coupled to the electronic display and/or the optical assembly, and shifts the light rays in accordance with display instructions. Light rays are shifted by rapidly changing a relative position of the electronic display to the optical assembly. A position of the electronic display, a position of the optical assembly, or positions of both the electronic display and the optical assembly may be adjusted to shift the light rays.

The NED assembly directs 640, via an optical assembly, the plurality of light rays emitted including the at least one shifted light ray toward an eye box. The NED assembly directs the light rays in accordance with the display instructions. The NED assembly uses the optical assembly to direct the light rays from the electronic display to the eye box. The light rays form a virtual display at the eye box. The virtual display has a resolution that may be dynamically varied. The virtual display has the resolution within the adjustable range of resolutions. Moreover, presented content has a frame rate within the adjustable range of frame rates.

Figure 7:
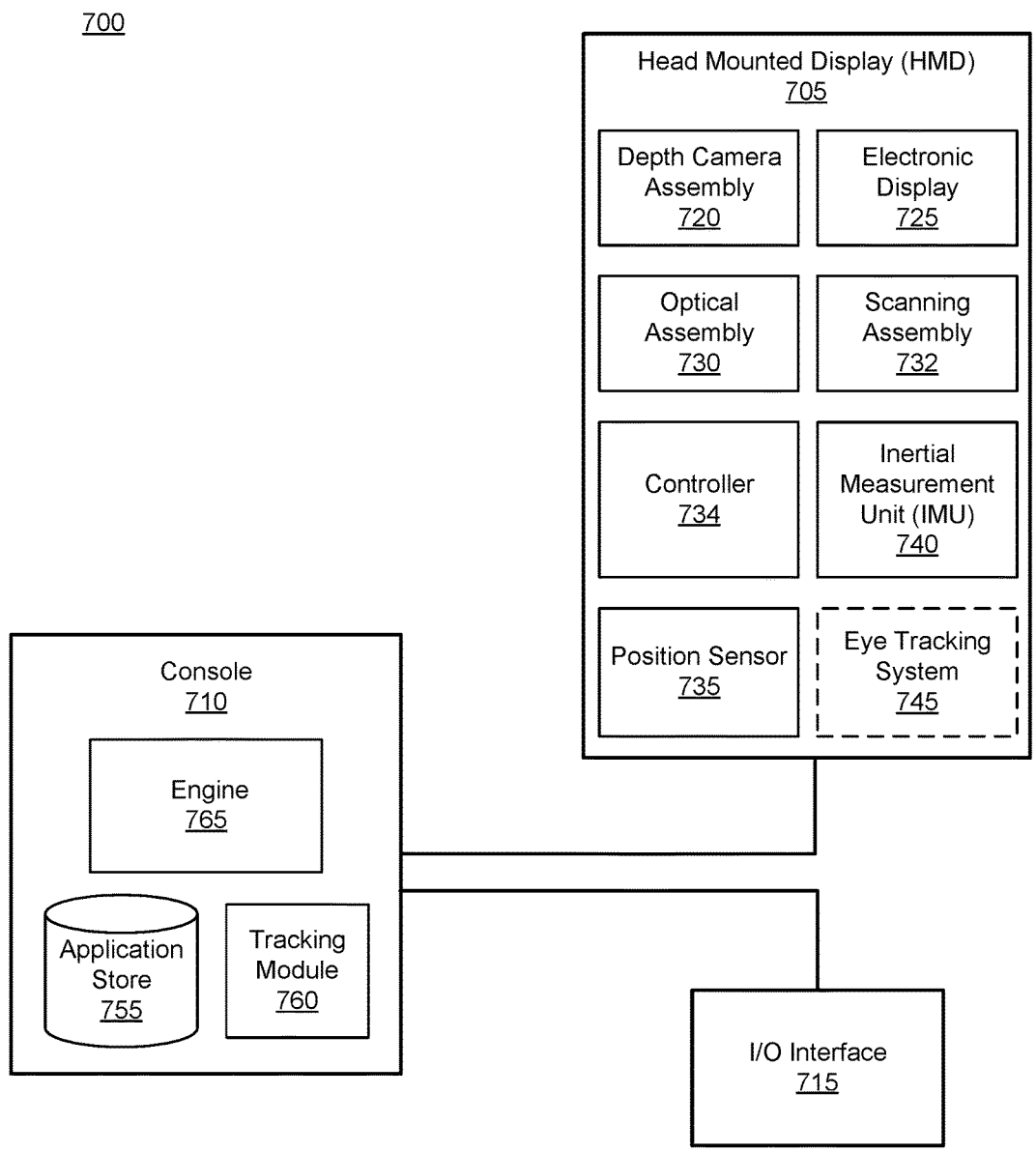
FIG. 7 is a block diagram of a HMD system in which a HMD operates, in accordance with one or more embodiments.

FIG. 7 is a block diagram of a HMD system 700 in which a HMD 705 operates, in accordance with one or more embodiments. The HMD system 700 may operate in an artificial reality system. The HMD system 700 shown by FIG. 7 comprises the HMD 705 and an input/output (I/O) interface 715 that is coupled to the console 710. While FIG. 7 shows an example HMD system 700 including one HMD 705 and on I/O interface 715, in other embodiments any number of these components may be included in the HMD system 700. For example, there may be multiple HMDs 705 each having an associated I/O interface 715, with each HMD 705 and I/O interface 715 communicating with the console 710. In alternative configurations, different and/or additional components may be included in the HMD system 700. Additionally, functionality described in conjunction with one or more of the components shown in FIG. 7 may be distributed among the components in a different manner than described in conjunction with FIG. 7 in some embodiments. For example, some or all of the functionality of the console 710 is provided by the HMD 705, the controller 734 may be part of the scanning assembly 732, etc.

The HMD 705 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 705, the console 710, or both, and presents audio data based on the audio information. The HMD 705 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 705 may be the HMD 100 described above in conjunction with FIG. 1.

The HMD 705 includes a DCA 720, an electronic display 725, an optical assembly 730, a scanning assembly 732, a controller 734, one or more position sensors 735, an IMU 740, and an optional eye tracking system 745. Some embodiments of the HMD 705 have different components than those described in conjunction with FIG. 7. Additionally, the functionality provided by various components described in conjunction with FIG. 7 may be differently distributed among the components of the HMD 705 in other embodiments.

The DCA 720 captures data describing depth information of a local area surrounding some or all of the HMD 705. The DCA 720 can compute the depth information using the data (e.g., based on a captured portion of a structured light pattern), or the DCA 720 can send this information to another device such as the console 710 that can determine the depth information using the data from the DCA 720.

The electronic display 725 displays two-dimensional or three-dimensional images to the user in accordance with data received from the console 710. In various embodiments, the electronic display 725 comprises a single electronic display or multiple electronic displays (e.g., a display for each eye of a user). Examples of the electronic display 725 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

In accordance with embodiments of the present disclosure, the electronic display 725 has a physical resolution determined by emitter configuration. In some embodiments, the electronic display 725 comprises a plurality of pixels, each pixel composed of three sub-pixels emitting light of different colors. In some embodiments, each sub-pixel is located in a different cell of a plurality of cells in the electronic display, each cell occupying a two-dimensional area with sub-pixel positions. In some embodiments, the electronic display 725 may comprise a two-dimensional array of sub-pixels, each three consecutive sub-pixels along a dimension of the electronic display emit light of different colors, each sub-pixel position in the electronic display being occupied by one of the sub-pixels in the array. The electronic display 725 can provide content at an adjustable range of color depth. There is a tradeoff in color depth with resolution for the electronic display 725. The electronic display 725 emits a plurality of light rays based in part on display instructions at a frame rate. The electronic display 725 may be an embodiment of the electronic display 215 of FIG. 2 and/or the electronic display 305 of FIG. 3.

The optical assembly 730 directs source light received from the electronic display 725 to a user of the HMD 705. The optical assembly 730 includes a plurality of optical elements. Example optical elements included in the optical assembly 730 include: an aperture, a Fresnel lens, a convex lens, a concave lens, a filter, a reflecting surface, or any other suitable optical element that affects image light. Moreover, the optical assembly 730 may include combinations of different optical elements. In some embodiments, one or more of the optical elements in the optical assembly 730 may have one or more coatings, such as partially reflective or anti-reflective coatings.

Magnification and focusing of the image light by the optical assembly 730 allows the electronic display 725 to be physically smaller, weigh less and consume less power than larger displays. Additionally, magnification may increase the field-of-view of the content presented by the electronic display 725. For example, the field-of-view of the displayed content is such that the displayed content is presented using almost all (e.g., approximately 110 degrees diagonal), and in some cases all, of the field-of-view. Additionally in some embodiments, the amount of magnification may be adjusted by adding or removing optical elements.

In some embodiments, the optical assembly 730 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 725 for display is pre-distorted, and the optical assembly 730 corrects the distortion when it receives image light from the electronic display 725 generated based on the content.

In accordance with embodiments of the present disclosure, the optical assembly 730 is configured to control a field of view at a user's eye box and direct a plurality of light rays emitting from the electronic display 725 toward the eye box. In some embodiments, operation of one or more electro-optical elements (e.g., one or more electro-optical liquid deformable surfaces) of the optical assembly 730 are controlled to shift directions of light rays emitted from the electronic display 725, based in part on display instructions. The optical assembly 730 directs the light rays to create a virtual display. As noted above the virtual display may dynamically vary resolution and/or frame rate. In other embodiments, one or more components of the optical assembly 730 may be rotated around an axis to shift the directions of the light rays, based in part on the display instructions. In some embodiments, the optical assembly 730 may represent the optical assembly 220 of FIG. 2 and/or the optical assembly 310 of FIG. 3.

The scanning assembly 732 is coupled to at least one of the electronic display 725 and the optical assembly 730. The scanning assembly 732 is configured to shift the directions of the light rays in accordance with the display instructions such that the virtual display is presented to the eye box, the virtual display having an adjustable range of resolutions including the physical resolution of the electronic display 725. In some embodiments, the scanning assembly 732 includes one or more micro-actuators (positioners) interfaced with the electronic display 725 and/or the optical assembly 730. The one or more micro-actuators of the scanning assembly 732 may be instructed to shift the relative position of the electronic display to the optical assembly during a time period, based in part on the display instructions. In some embodiments, the scanning assembly 732 is configured to shift the directions of the light rays by shifting a relative position of the electronic display 725 to the optical assembly 730 in accordance with the display instructions. The scanning assembly 732 may shift the directions of the light rays by shifting a relative position of the electronic display 725 to the optical assembly 730 in accordance with the display instructions by one sub-pixel position in the cell at each time sample in the time period. Alternatively, the scanning assembly 732 may shift the directions of the light rays by shifting a relative position of the electronic display 725 to the optical assembly 730 in accordance with the display instructions by one sub-pixel position along a first dimension at a first time sample in the time period and by one sub-pixel position along a second dimension perpendicular to the first dimension at a second time sample of the time period. In some embodiments, the scanning assembly 732 is configured to shift a direction of at least one of the light rays in accordance with the display instructions, wherein the second resolution of the virtual display presented to the eye box may be increased by at least one virtual pixel relative to the first resolution of the electronic display 725. By these principles, the scanning assembly 732 can increase resolution while trading off frame rate. In a contrary manner, the scanning assembly 732 can maintain lower resolution while also maintaining higher frame rate. The scanning assembly 732 in tandem with the electronic display 725 and the optical assembly 730 can adjust both resolution and frame rate within an adjustable range of resolutions and an adjustable range of frame rates, respectively. The scanning assembly 732 may be an embodiment of the scanning assembly 315 of FIG. 3.

The controller 734 managers operation of the electronic display 725, the optical assembly 730, and the scanning assembly 732. The controller 734 generates display instructions based on content provided to the HMD 705 for presentation to a wearing user of the HMD 705. The controller 734 determines a target frame rate and a target resolution based on the content. The controller 734 then generates display instructions to achieve the target frame rate and the target resolution. The display instructions includes instructions for the electronic display 725, the optical assembly 730, and the scanning assembly 732. Additionally, the display instructions specify a target color depth for the electronic display 725. The controller 734 may be an embodiment of the controller 320 of FIG. 3.

In an additional embodiment, the electronic display 725, the optical assembly 730, and the scanning assembly 732 may generate a virtual display with foveated rendering. Based at least in part on the determined eye tracking information obtained from the eye tracking system 745, the HMD 705 can utilize the principles described above to render varying portions of the virtual display different levels of resolution. In this case, the controller 734 may update display instructions so as to instruct the electronic display 725, the optical assembly 730, and the scanning assembly 732 to generate a virtual display with the levels of resolution. The virtual display would have a first level with the highest resolution in a portion intersecting a gaze specified by the eye-tracking information. Additionally, the virtual display may have a maximum pixel density only in a foveal region of the user's eye-gaze, while providing image signals with lower pixel densities in other regions of the virtual display.

The IMU 740 is an electronic device that generates data indicating a position of the HMD 705 based on measurement signals received from one or more of the position sensors 735 and from depth information received from the DCA 720. A position sensor 735 generates one or more measurement signals in response to motion of the HMD 705. Examples of position sensors 735 include: one or more accelerometers, one or more gyroscopes, one or more magnetometers, another suitable type of sensor that detects motion, a type of sensor used for error correction of the IMU 740, or some combination thereof. The position sensors 735 may be located external to the IMU 740, internal to the IMU 740, or some combination thereof.

Based on the one or more measurement signals from one or more position sensors 735, the IMU 740 generates data indicating an estimated current position of the HMD 705 relative to an initial position of the HMD 705. For example, the position sensors 735 include multiple accelerometers to measure translational motion (forward/back, up/down, left/right) and multiple gyroscopes to measure rotational motion (e.g., pitch, yaw, roll). In some embodiments, the position sensors 735 may represent the position sensors 135 of FIG. 1. In some embodiments, the IMU 740 rapidly samples the measurement signals and calculates the estimated current position of the HMD 705 from the sampled data. For example, the IMU 740 integrates the measurement signals received from the accelerometers over time to estimate a velocity vector and integrates the velocity vector over time to determine an estimated current position of a reference point on the HMD 705. Alternatively, the IMU 740 provides the sampled measurement signals to the console 710, which interprets the data to reduce error. The reference point is a point that may be used to describe the position of the HMD 705. The reference point may generally be defined as a point in space or a position related to the HMD's 705 orientation and position.

The IMU 740 receives one or more parameters from the console 710. The one or more parameters are used to maintain tracking of the HMD 705. Based on a received parameter, the IMU 740 may adjust one or more IMU parameters (e.g., sample rate). In some embodiments, certain parameters cause the IMU 740 to update an initial position of the reference point so it corresponds to a next position of the reference point. Updating the initial position of the reference point as the next calibrated position of the reference point helps reduce accumulated error associated with the current position estimated the IMU 740. The accumulated error, also referred to as drift error, causes the estimated position of the reference point to "drift" away from the actual position of the reference point over time. In some embodiments of the HMD 705, the IMU 740 may be a dedicated hardware component. In other embodiments, the IMU 740 may be a software component implemented in one or more processors. In some embodiments, the IMU 740 may represent the IMU 130 of FIG. 1.

In some embodiments, the eye tracking system 745 is integrated into the HMD 705. The eye tracking system 745 determines eye tracking information associated with an eye of a user wearing the HMD 705. The eye tracking information determined by the eye tracking system 745 may comprise information about an orientation of the user's eye, i.e., information about an angle of an eye-gaze. In some embodiments, the eye tracking system 745 is integrated into the optical assembly 730. An embodiment of the eye tracking system 745 may comprise an illumination source and an imaging device (camera). The eye tracking information can be used for foveated rendering by adjusting resolution and frame rate depending on the gaze of the user. For example, the virtual display may contain a portion where the user's gaze intersects which is of a higher resolution but lower frame rate; whereas, the remaining portion of the virtual display can be maintained at a lower resolution with some frame rate.

The I/O interface 715 is a device that allows a user to send action requests and receive responses from the console 710. An action request is a request to perform a particular action. For example, an action request may be an instruction to start or end capture of image or video data or an instruction to perform a particular action within an application. The I/O interface 715 may include one or more input devices. Example input devices include: a keyboard, a mouse, a game controller, or any other suitable device for receiving action requests and communicating the action requests to the console 710. An action request received by the I/O interface 715 is communicated to the console 710, which performs an action corresponding to the action request. In some embodiments, the I/O interface 715 includes an IMU 740 that captures IMU data indicating an estimated position of the I/O interface 715 relative to an initial position of the I/O interface 715. In some embodiments, the I/O interface 715 may provide haptic feedback to the user in accordance with instructions received from the console 710. For example, haptic feedback is provided when an action request is received, or the console 710 communicates instructions to the I/O interface 715 causing the I/O interface 715 to generate haptic feedback when the console 710 performs an action.

The console 710 provides content to the HMD 705 for processing in accordance with information received from one or more of: the DCA 720, the HMD 705, and the I/O interface 715. In the example shown in FIG. 7, the console 710 includes an application store 755, a tracking module 760, and an engine 765. Some embodiments of the console 710 have different modules or components than those described in conjunction with FIG. 7. Similarly, the functions further described below may be distributed among components of the console 710 in a different manner than described in conjunction with FIG. 7.

The application store 755 stores one or more applications for execution by the console 710. An application is a group of instructions, that when executed by a processor, generates content for presentation to the user. Content generated by an application may be in response to inputs received from the user via movement of the HMD 705 or the I/O interface 715. Examples of applications include: gaming applications, conferencing applications, video playback applications, or other suitable applications.

The tracking module 760 calibrates the HMD system 700 using one or more calibration parameters and may adjust one or more calibration parameters to reduce error in determination of the position of the HMD 705 or of the I/O interface 715. For example, the tracking module 760 communicates a calibration parameter to the DCA 720 to adjust the focus of the DCA 720 to more accurately determine positions of structured light elements captured by the DCA 720. Calibration performed by the tracking module 760 also accounts for information received from the IMU 740 in the HMD 705 and/or an IMU 740 included in the I/O interface 715. Additionally, if tracking of the HMD 705 is lost (e.g., the DCA 720 loses line of sight of at least a threshold number of structured light elements), the tracking module 760 may re-calibrate some or all of the HMD system 700.

The tracking module 760 tracks movements of the HMD 705 or of the I/O interface 715 using information from the DCA 720, the one or more position sensors 735, the IMU 740 or some combination thereof. For example, the tracking module 750 determines a position of a reference point of the HMD 705 in a mapping of a local area based on information from the HMD 705. The tracking module 760 may also determine positions of the reference point of the HMD 705 or a reference point of the I/O interface 715 using data indicating a position of the HMD 705 from the IMU 740 or using data indicating a position of the I/O interface 715 from an IMU 740 included in the I/O interface 715, respectively. Additionally, in some embodiments, the tracking module 760 may use portions of data indicating a position or the HMD 705 from the IMU 740 as well as representations of the local area from the DCA 720 to predict a future location of the HMD 705. The tracking module 760 provides the estimated or predicted future position of the HMD 705 or the I/O interface 715 to the engine 755. Additionally, the predicted position of the HMD 705 can be used to generate synthetic frames to be presented at the predicted position of the HMD 705. Likewise, rapid movement of the HMD 705 may cause adjustment of frame rate to better suit the rapid movement of the HMD 705, thereby also providing smoother movement as viewed by the user.

The engine 765 generates a 3D mapping of the area surrounding some or all of the HMD 705 (i.e., the "local area") based on information received from the HMD 705. In some embodiments, the engine 765 determines depth information for the 3D mapping of the local area based on information received from the DCA 720 that is relevant for techniques used in computing depth. The engine 765 may calculate depth information using one or more techniques in computing depth from structured light. In various embodiments, the engine 765 uses the depth information to, e.g., update a model of the local area, and generate content based in part on the updated model.

The engine 765 also executes applications within the HMD system 700 and receives position information, acceleration information, velocity information, predicted future positions, or some combination thereof, of the HMD 705 from the tracking module 760. Based on the received information, the engine 765 determines content to provide to the HMD 705 for presentation to the user. For example, if the received information indicates that the user has looked to the left, the engine 765 generates content for the HMD 705 that mirrors the user's movement in a virtual environment or in an environment augmenting the local area with additional content. Additionally, the engine 765 performs an action within an application executing on the console 710 in response to an action request received from the I/O interface 715 and provides feedback to the user that the action was performed. The provided feedback may be visual or audible feedback via the HMD 705 or haptic feedback via the I/O interface 715.

In some embodiments, based on the eye tracking information (e.g., orientation of the user's eye) received from the eye tracking system 745, the engine 765 determines resolution of the content provided to the HMD 705 for presentation to the user on the electronic display 725. The engine 765 provides the content to the HMD 705 having a maximum pixel resolution on the electronic display 725 in a foveal region of the user's gaze, whereas the engine 765 provides a lower pixel resolution in other regions of the electronic display 725, thus achieving less power consumption at the HMD 705 and saving computing cycles of the console 710 without compromising a visual experience of the user. In some embodiments, the engine 765 can further use the eye tracking information to adjust where objects are displayed on the electronic display 725 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A near-eye display (NED) comprising:
a controller including one or more processors configured to generate display instructions based in part on content, wherein the display instructions describe a resolution within an adjustable range of resolutions and a frame rate within an adjustable range of frame rates;
an electronic display configured to emit a plurality of light rays at the frame rate based on the display instructions;
a scanning assembly configured to shift a direction of at least one of the plurality of light rays based on the display instructions; and
an optical assembly configured to control a field of view at an eye box and to direct the plurality of light rays including the at least one shifted light ray toward the eye box to form a virtual display that displays the content at the resolution and the frame rate.

2. The NED of claim 1, wherein the resolution within the adjustable range of resolutions is inversely proportional to the frame rate within the adjustable range of frame rates.

3. The NED of claim 1, wherein the virtual display comprises a first portion of the virtual display having a first resolution and a second portion of the virtual display having a second resolution, wherein the first resolution and the second resolution are within the adjustable range of resolutions.

4. The NED of claim 3, wherein the first portion of the virtual display having the first resolution is presented with a first color depth and the second portion of the virtual display having the second resolution is presented with a second color depth, wherein the first color depth is greater than the second color depth.

5. The NED of claim 3 further comprising:
an eye tracking assembly comprising a camera configured to track a gaze location of a user, and
wherein the controller is further configured to:
dynamically set the first portion of the virtual display to coincide with the gaze location, wherein the first resolution is associated with a foveal resolution of a model of a human eye.

6. The NED of claim 5 wherein the second resolution comprises a range of resolutions that map to a resolution profile of a non-foveal region of the model of the human eye.

7. The NED of claim 1, wherein the scanning assembly is further configured to shift a relative position of the electronic display to the optical assembly by shifting the electronic display.

8. The NED of claim 1, wherein the scanning assembly is further configured to shift a relative position of the electronic display to the optical assembly by shifting the optical assembly.

9. The NED of claim 1, wherein the controller is further configured to:
determine that the content comprises an object moving faster than a threshold value in a field of view of the NED; and
generate the display instructions so as to present the content with an increased frame rate, but reduced resolution.

10. The NED of claim 9, wherein the electronic display is configured to:
generate one or more synthetic frames using one or more frames from the content and one or more future positions of the NED; and
upsample the content from a first frame rate to a second frame rate using one or more synthetic frames to generate augmented content, wherein the second frame rate is faster than the first frame rate.

11. The NED of claim 1, wherein the controller is further configured to:
identify a frame rate adjustment flag in the content;
determine a target frame rate within the adjustable range of frame rates based in part on the frame rate adjustment flag; and
generate the display instructions so as to present the content with at the target frame rate.

12. The NED of claim 11, wherein the controller is further configured to:
determine a target resolution within the adjustable range of resolutions based in part on the frame rate adjustment flag.

13. A method comprising:
generating, via a controller, display instructions based in part on content, wherein the display instructions describe a resolution within an adjustable range of resolutions and a frame rate within an adjustable range of frame rates;
emitting, via an electronic display, a plurality of light rays at the frame rate based on the display instructions;
shifting, via a scanning assembly, a direction of at least one of the plurality of light rays based on the display instructions; and
directing, via an optical assembly, the plurality of light rays including the at least one shifted light ray toward an eye box to form a virtual display that displays the content at the resolution and the frame rate.

14. The method of claim 13, wherein the resolution within the adjustable range of resolutions is inversely proportional to the frame rate within the adjustable range of frame rates.

15. The method of claim 13, wherein the virtual display comprises a first portion of the virtual display having a first resolution and a second portion of the virtual display having a second resolution, wherein the first resolution and the second resolution are within the adjustable range of resolutions.

16. The method of claim 15, wherein the first portion of the virtual display having the first resolution is presented with a first color depth and the second portion of the virtual display having the second resolution is presented with a second color depth, wherein the first color depth is greater than the second color depth.

17. The method of claim 13, wherein the virtual display comprises a first portion of the virtual display having a first resolution and a second portion of the virtual display having a second resolution, and the first resolution and the second resolution are within the adjustable range of resolutions, the method further comprising:
tracking a gaze location of a user; and
dynamically setting the first portion of the virtual display to coincide with the gaze location, wherein the first resolution is associated with a foveal resolution of a model of a human eye.

18. The method of claim 13, wherein the shifting the direction of at least one of the plurality of light rays based on the display instructions further comprises:

shifting the electronic display to shift a relative position of the electronic display to the optical assembly.

19. The method of claim 13, wherein the shifting the direction of at least one of the light rays based on the display instructions further comprises:

shifting the optical assembly to shift a relative position of the electronic display to the optical assembly.

20. The method of claim 13 further comprising:

determining that the content comprises an object moving faster than a threshold value in a field of view of the NED; and generating the display instructions so as to present the content with an increased frame rate, but reduced resolution.

* * * * *